(12) United States Patent
Weitzel

(10) Patent No.: US 7,257,334 B1
(45) Date of Patent: Aug. 14, 2007

(54) DEVICE TO DETECT OR GENERATE OPTICAL SIGNALS

(75) Inventor: Thilo Weitzel, Tübingen (DE)

(73) Assignee: CAMPus Technologies AG, Zug (CH)

( * ) Notice: Subject to any disclaimer, the term of this patent is extended or adjusted under 35 U.S.C. 154(b) by 0 days.

(21) Appl. No.: 09/232,119

(22) Filed: Jan. 15, 1999

(30) Foreign Application Priority Data

Jan. 16, 1998 (DE) ................ 198 01 469

(51) Int. Cl.
*H04B 10/04* (2006.01)
*H04B 10/06* (2006.01)
*H04B 10/12* (2006.01)
*H04B 10/145* (2006.01)
*H04B 10/148* (2006.01)

(52) U.S. Cl. .............. 398/212; 398/187; 398/188; 398/201

(58) Field of Classification Search ........ 359/190–191, 359/181–183; 398/202–214, 201, 187, 188; 356/450–456
See application file for complete search history.

(56) References Cited

U.S. PATENT DOCUMENTS

| | | | | |
|---|---|---|---|---|
| 2,151,631 A | * | 3/1939 | Williams | 356/450 |
| 3,469,923 A | * | 9/1969 | Mertz | 356/451 |
| 3,482,919 A | * | 12/1969 | Barringer | 356/455 |
| 4,190,366 A | * | 2/1980 | Doyle | 356/455 |
| 4,533,247 A | * | 8/1985 | Epworth | 356/479 |
| 5,059,027 A | | 10/1991 | Roesler et al. | 356/346 |
| 5,073,331 A | * | 12/1991 | Shirasaki | 372/26 |
| 5,313,266 A | | 5/1994 | Keolian et al. | |
| 5,351,124 A | * | 9/1994 | Laskoskie et al. | 356/477 |
| 5,412,474 A | * | 5/1995 | Reasenberg et al. | 356/486 |
| 5,636,195 A | * | 6/1997 | Saikan et al. | 369/100 |
| 5,847,828 A | * | 12/1998 | Downs | 356/451 |
| 5,991,062 A | * | 11/1999 | Fischer et al. | 359/191 |
| 6,091,522 A | * | 7/2000 | Snawerdt, III et al. | 359/191 |
| 6,104,517 A | * | 8/2000 | Blodgett et al. | 398/201 |
| 6,115,121 A | * | 9/2000 | Erskine | 356/450 |

FOREIGN PATENT DOCUMENTS

| | | |
|---|---|---|
| DE | 3820170 | 12/1989 |
| EP | 0297556 | 1/1989 |

OTHER PUBLICATIONS

Hecht, E. and A. Zajac. Optics. Reading, Massachusetts: Addison Wesley Publishing Company, Inc., 1974. p. 37-38, 62-65, 189-190, 286-290.*
Patent Abstracts of Japan No. 04055726, Feb. 24, 1992 and JP 02165566.

* cited by examiner

*Primary Examiner*—Jason Chan
*Assistant Examiner*—David S Kim
(74) *Attorney, Agent, or Firm*—Dilworth & Barrese LLP

(57) ABSTRACT

The present invention relates to a device for detecting or generating and modulating optical signals, and having an angular dispersive element arranged to change angles of the optical signals or carrier and/or reference rays brought to interference.

4 Claims, 5 Drawing Sheets showing the coupler a)

b)

c)

d)

Fig. 5, showing the coupler
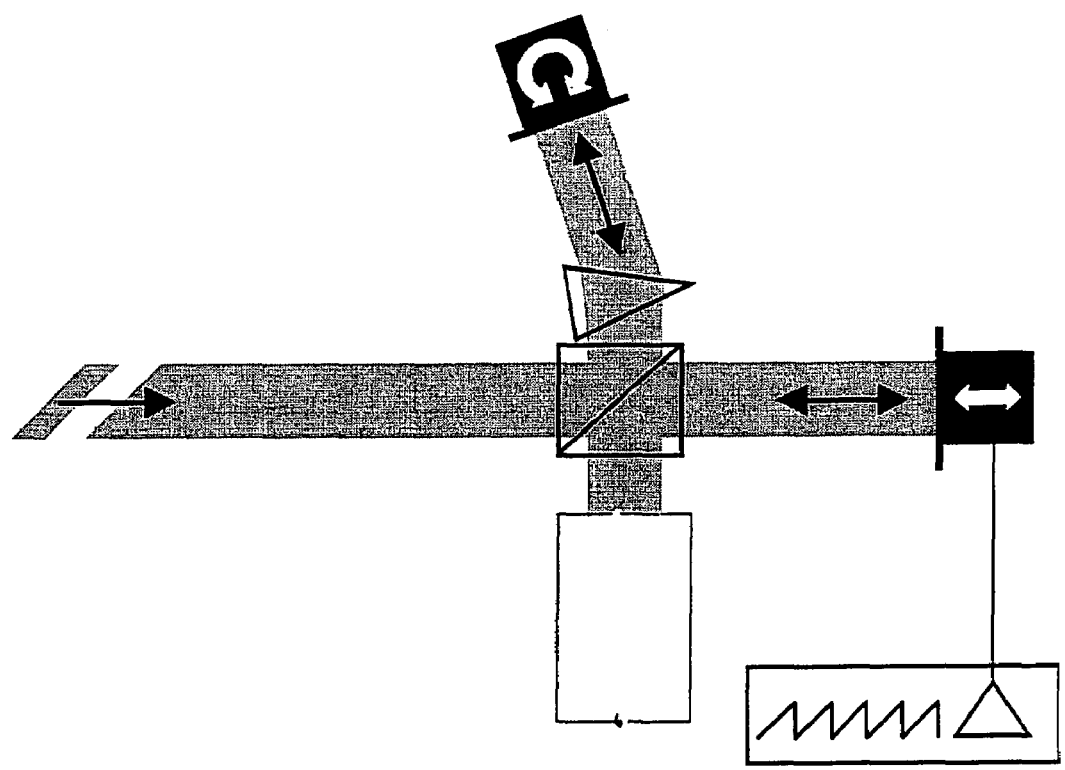

DEVICE TO DETECT OR GENERATE OPTICAL SIGNALS

BACKGROUND OF THE INVENTION

The present invention relates to a device to detect optical signals with means to generate at least one reference light ray which has frequency shift and/or frequency modulation or phase shift and/or phase modulation and/or time displacement over the optical signal to be detected, with means with which the optical signal to be detected and/or the reference light ray(s) can be aligned in such a way that they can be brought into interference and with at least one detector with a demodulator by means of which amplitude modulation can be detected.

The invention further relates to a device to generate optical signals by means of modulation of optical carriers with means to generate at least one reference light ray which has frequency shift and/or frequency modulation or phase shift and/or phase modulation and/or time displacement over the optical carrier to be modulated, with means with which the optical signal to be detected and/or the reference light rays can be aligned in such a way that they can be brought into interference and with at least one coupler by means of which the resulting interference signal can be coupled out.

The invention further relates to the use of a device in accordance with the invention as an optical receiver or an optical modulator or as a spectrometer.

The optical information transfer is based on different methods which are each based on the modulation of certain properties of the optical carrier wave. When a laser is used as the light source, information can be effected by time modulation of the amplitude, the frequency, the phase or the polarisation of the light source, with a modulation of the polarization only being used in special cases due to technical difficulties in the transfer in optical fibers. The essential element of such methods for optical information transfer is the optical receiver which must be capable of recognising the relevant modulation within a very short time even at a very low intensity of the signal received.

The simplest method (direct detection) comprises the measurement of the intensity of the incident optical carrier. Accordingly, only a modulation of the intensity, i.e. amplitude modulation (amplitude shift keying, ASK) can be used as the modulation method. In addition, a very strong modulation of the frequency of the optical carrier can be detected by the receiver with the aid of one or more suitable optical filters directly as amplitude modulation, too.

The modulation forms of phase and frequency modulation require the overlapping in the receiver of the incident optical signal to be detected with a local reference light source (local oscillator, LO). Here, a difference is made between homodyne detection and heterodyne detection, with the reference light source possessing the same frequency as the optical signal to be detected in the first case and a different frequency in the second case. In the so-called quasi-heterodyne detection method, only the phase position of the reference light source is varied. The overlapping of optical signal and light of the reference light source leads to an interference signal from which, depending on the arrangement, the amplitude and phase or frequency of the signal to be detected can be derived with reference to the local reference source.

Furthermore, a difference is made between coherent (coherent detection) and non-coherent (non-coherent detection) receivers. While with coherent detection, the modulation of the interference signal is evaluated with amplitude and phase position, with non-coherent detection, only the intensity of the modulation is detected, i.e. in this case, the envelope curve of the interference signal is observed. In the case of coherent detection, the local reference source must be stabilized according to frequency and phase position and must track the incident optical carrier, while with the non-coherent detection, a control of the frequency of the local reference light source is sufficient.

The homodyne detection allows the measurement of the phase and thus of the phase modulation (phase shift keying, PSK) of the optical carrier wave; heterodyne detection also allows the detection of phase jumps in the optical carrier wave (differential phase shift keying, DPSK). The heterodyne detection is also used for the detection of a frequency modulation (frequency shift keying, FSK). In this case, the different frequencies can be detected electronically in the interference signal. Both the direct detection (ASK) and the heterodyne methods can transfer several sub-carriers modulated up in the radio wave range (sub-carrier modulation (SCM). The SCM methods are gaining in significance as the bandwidth of the feasible single connections increases since a single optical channel can be used for several independent data streams.

The following are just some of the possibilities:
Direct detection: ASK
Heterodyne, non-coherent detection: ASK, FSK, DPSK
Heterodyne, coherent detection: ASK, FSK, PSK
Homodyne, coherent detection: ASK, PSK The bandwidth of the signal which can be transferred and also the technical effort grow in accordance with this list. On the receiver side, coherent detection, in particular homodyne coherent detection, means a high technical effort due to the required stabilization of the local reference light source.

To cover the range between bandwidths which can still be handled and processed electronically (<1 GHz) and the transfer capacity of the optical systems, several optical carriers of different wavelengths can be used which use the optical system together, but which are used individually by independent transmitters/receivers. If a sufficiently high wavelength selectivity can be achieved, this wavelength division multiplexing procedure (WDM) allows the selection of a bandwidth for the modulation of the individual optical carriers suitable for the corresponding application and technology without essentially restricting the transfer capacity of the optical system (high density wavelength division multiplexing or hd WDM). One particularly interesting application field is represented by optical multi-channel networks as the ability of the receiver to select a single channel leads to a substantial simplification of the distribution nodes in the network (tunable channel, multi-access networks or TCMA).

SUMMARY OF THE INVENTION

The physical connection between the size of an optical element and its maximum possible spectral resolution does not allow spatially small elements a spectral resolution in the GHz range. While homodyne and heterodyne detection with a local reference light source allow a very high spectral resolution, the control of the reference light source requires a high technical effort.

It is therefore the object of the present invention to further develop a generic device to detect or generate optical signals in such a way that it possesses a high spectral resolution even when relatively small optical elements are used and the wavelength of the optical carrier to be received or modulated should be freely selectable without great technical effort being created for the control of a local reference light source.

This object is solved in accordance with the invention by at least one wavelength-dependent element being provided by means of which the angle(s) of the light rays brought to interference can be changed in dependence on the wavelength and by at least one of the detectors being designed in such a way or being in combination with a demodulator and/or with optical elements in such a way that a time and/or spatial modulation of the intensity with reference to the whole or parts of the detected ray cross-section can be measured.

If, in the otherwise unchanged device, instead of the (or at least one of the) detector(s), a coupler is inserted, the device can be used to generate optical signals by modulation of optical carriers and thus as a modulator. Based on a generic device to generate optical signals by modulation of optical carriers, the basic object is solved by at least one wavelength-dependent element being provided by means of which the angle(s) of the light rays brought to interference can be changed in dependence on the wavelength and by at least one of the couplers being designed in such a way or being in combination with a demodulator and/or with optical elements in such a way that the coupled out signal is dependent on the time and/or spatial modulation of the intensity with reference to the whole or parts of the ray cross-section detected.

In accordance with a preferred embodiment of the present invention, the means to generate at least one reference light ray, which has frequency shift and/or frequency modulation or phase shift and/or phase modulation and/or time displacement over the optical signal to be detected, includes a beam splitter and a frequency shifter and/or frequency modulator or a phase shifter and/or phase modulator and/or a travel distance. This embodiment is advantageous as a local light source can be dispensed with. By dispensing with the local oscillator, the arrangement becomes technically substantially simpler, but nevertheless allows a high spectral resolution.

The means to generate at least one reference light ray which has frequency shift and/or frequency modulation or phase shift and/or phase modulation and/or time displacement over the optical signal to be detected, can include a local light source.

In another embodiment of the present invention, it is provided that at least one of the wavelength-dependent elements includes a diffracting optical element, in particular an optical grating, a hologram or a system of thin films.

At least one of the wavelength-dependent elements can include a dispersing optical element, in particular a prism.

It is especially advantageous, if the (or at least one of the) wavelength-dependent element(s) is designed as a beam splitter or combiner.

In accordance with one preferred embodiment of the present invention, at least one of the wavelength-dependent elements is designed in such a way that the type or degree of dependence of the angle deflection can be changed by the wavelength. In particular, a design as an acousto-optical modulator is possible.

The wavelength-dependent element can simultaneously be designed as a frequency shifter and/or frequency modulator or phase shifter and/or modulator. One or more of the wavelength-dependent elements can be designed as an acousto-optical modulator.

It is particularly advantageous if means are provided by means of which the reference light ray and/or the optical signal can be deflected.

Furthermore, at least one of the wavelength-dependent elements can be positioned in a rotating and/or swivel manner. With embodiment variations which can be derived from a device in accordance with means for generating at least one reference light ray, which has frequency shift and/or frequency modulation or phase shift and/or phase modulation and/or time displacement over the optical signal to be detected, including a beam splitter and a frequency shifter and/or frequency modulator or a phase shifter and/or phase modulator and/or travel distance, the wavelength of the signal to be demodulated can be freely set by adjusting the geometry. In particular, it is possible in various variations of the device to select the wavelength by a simple turning of one of the optical elements.

In another embodiment of the present invention, at least one multiplex hologram is provided and/or other optical elements by means of which multiple rays can be handled simultaneously. By using multiplex holograms, reception can be performed simultaneously on multiple channels, if necessary with the aid of additional detectors.

In accordance with a preferred embodiment of the present invention, parts of the device are provided in multiple and/or multiple rays can be handled by parts of the devices named.

It is especially advantageous if means to change the ray cross-section of at least one of the rays involved are provided. In this case, the incident ray does not necessarily have to be expanded prior to entering the apparatus. Depending on the arrangement of the dispersing or diffracting elements, the ray expansion can be performed at different points, also inside the device. The spectral resolution of the apparatus increases with the ray diameter, in particular with the ray diameter in the plane of the angle deflection of the wavelength-dependent elements.

In another embodiment of the present invention, means can be provided for the spectral filtration or spatial modulation of phase or amplitude of at least one of the rays involved. A suitable definition of the ray profile can further improve the spectral resolution.

It is particularly advantageous if all or one part of the rays involved are directed wholly or partially through waveguides and/or if all or one part of the optical elements are formed by means of the integrated optical system.

The invention relates further to the use of a device in accordance with the invention as the optical receiver or optical modulator or as the spectrometer. The use as the spectrometer is based on the wavelength selectivity of the device in accordance with the invention.

BRIEF DESCRIPTION OF THE DRAWINGS

Further details and advantages of the device in accordance with the invention are explained in more detail by means of an example embodiment shown in the drawing, wherein

FIG. 5 shows a principle design of a device in accordance with the invention utilizing a coupler; and

DESCRIPTION OF THE PREFERRED EMBODIMENTS

The functional principle of the present invention is based on the fact that the information transferred by the incident light ray (optical signal to be detected) or by the coupled out light ray (modulated optical carrier) is represented exclusively by time modulation of amplitude, frequency or relative phase position. The angles of incidence or emergence of the rays do not carry any information, but are, in contrast, as a rule kept constant. Furthermore, the rays do not carry any spatial modulation.

The device in accordance with the invention transmits the spectral properties of the suitably expanded incident light ray in the angle space. The different angle components can now be imaged by interference with a suitably generated reference ray to a spatial modulation, with the different angle components showing a characteristic interference pattern in each case. By means of a heterodyne or quasi-heterodyne procedure, interference patterns matching certain angle components can be detected with high selectivity and sensitivity.

Unlike standard spectrometers with dispersing or diffracting elements, with this new method the different spectral components do not have to be separated spatially for detection.

Figure 1:
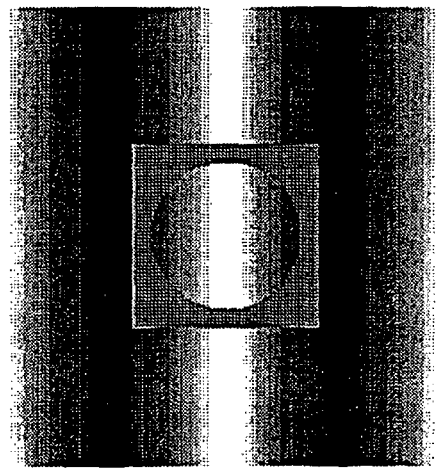
FIG. 1: shows the spatial and time modulation of the intensity at the location of a detector.
Figure 1:
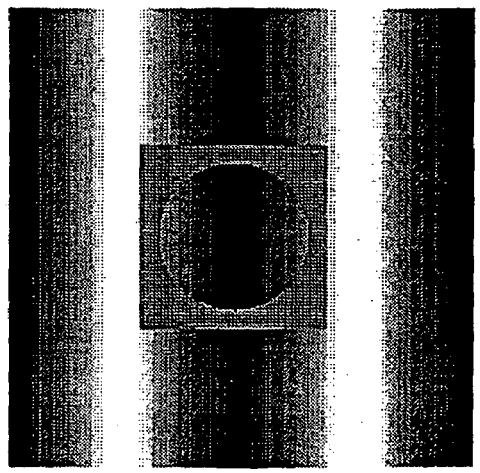
Figure 1:
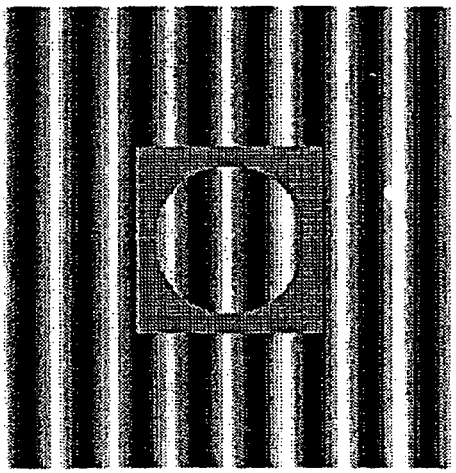
Figure 1:
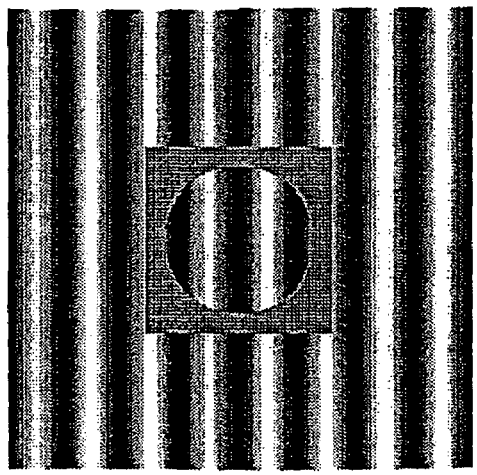

By way of illustration, FIG. 1 shows the resulting spatial and time modulation of the intensity at the site of one of the detectors for a simple arrangement with flat waves. If the device is adjusted to the wavelength of the incident light ray, the period of the spatial modulation of the interference pattern occurring at the detector is very large. In particular, the spatial period of this interference pattern can become larger than the ray cross-section detected by the detector. FIGS. 1 a) and 1 b) show this situation for two points of time with relative phase positions of the partial rays being different by $\pi$. The marked region at the center of the interference pattern shown represents the range of the rays detected by the detector.

Any change in the relative phase position of the partial rays leads to a lateral shift in the interference pattern. In the situation shown, this leads to very high time modulation of the intensity integrated over the area detected. Even very small differences in the wavelength of the incident light ray lead to a great shortening of the period of the interference pattern in each case. FIGS. 1 c) and 1 d) show such a situation for two points of time with relative phase positions of the partial rays differing by $\pi$. The area detected by the detector overlaps several light and dark strips. As the number of strips increases, the time modulation of the interference signal integrated over the area detected which can be measured for a lateral shift of the interference pattern falls rapidly.

Figure 2:
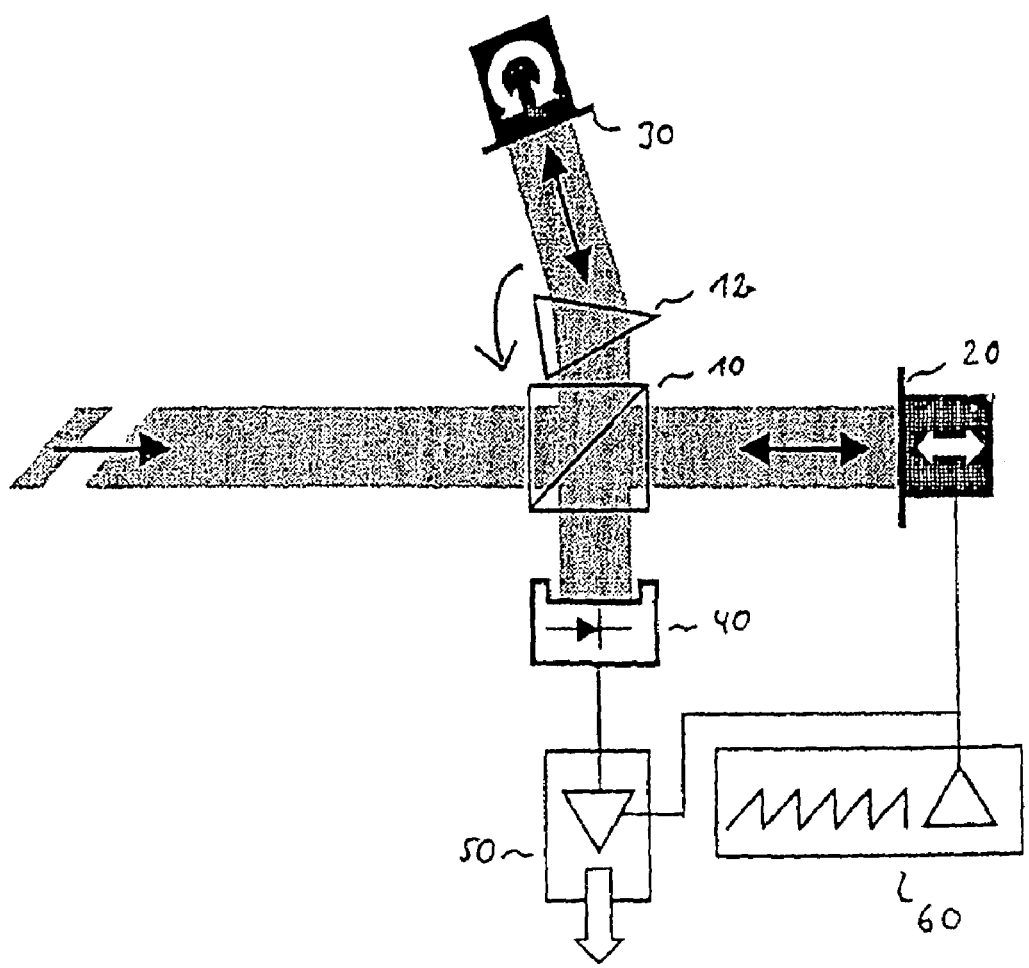
FIG. 2: shows a principle design of a device in accordance with the invention using the ray path of a Michelson interferometer.

FIG. 2 shows the principle design of a simple embodiment of a device in accordance with the invention using the ray path of a Michelson interferometer with the beam splitter 10. A prism 12 is used as the wavelength-dependent element. One of the mirrors 20 forms, by suitable means to shift this mirror, a phase modulator, the other mirror 30 is pivoted in a suitable manner to select the wavelength to be detected. The detector 40 has an areal design and integrates the intensity over the whole cross-section of the ray detected. A lock-in amplifier is used as the demodulator 50. To control the mirror 20 designed as a phase modulator, the modulator control 60 is used.

Figure 3:
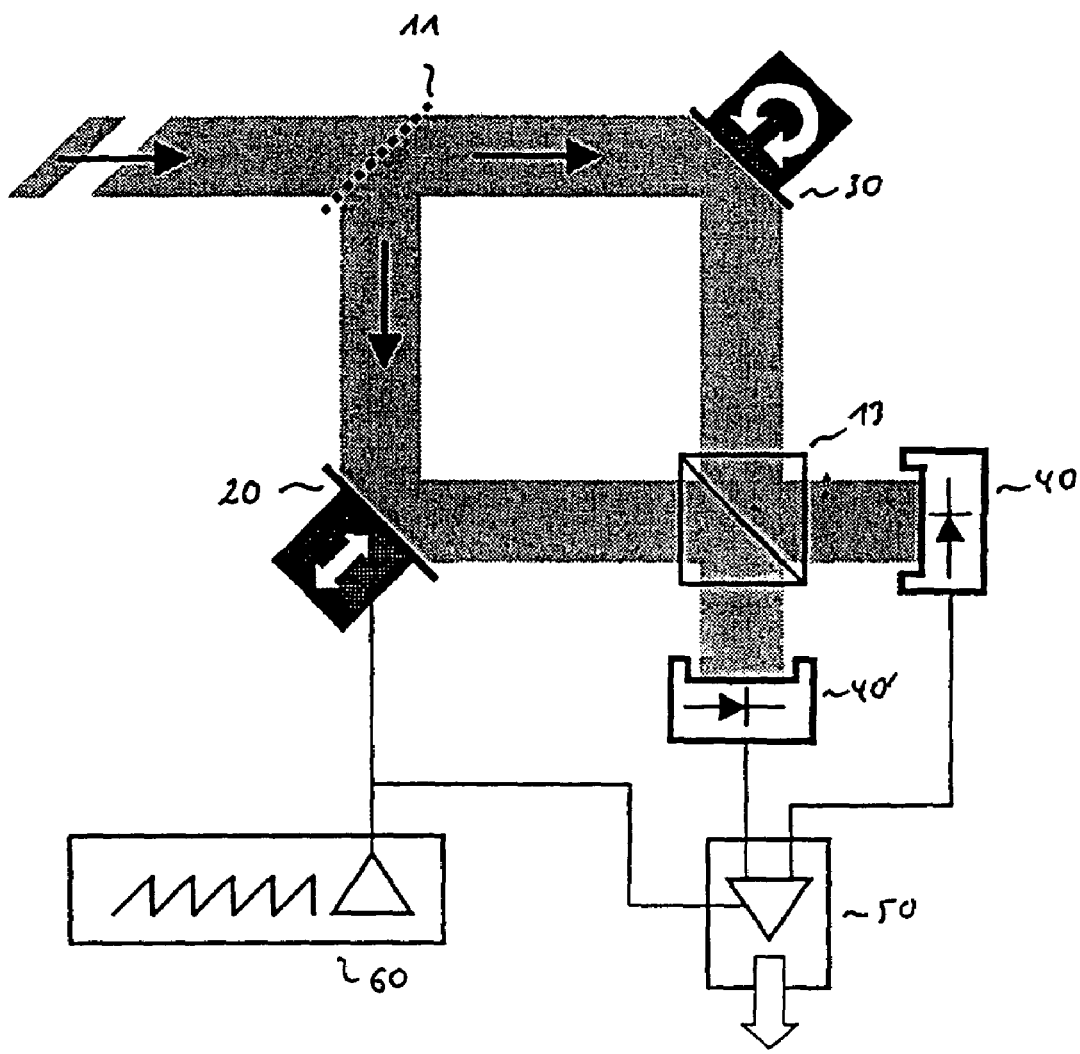
FIG. 3 shows a principle design of a device in accordance with the invention using the ray path of a Mach-Zehnder interferometer.

FIG. 3 shows the principle design of a simple embodiment of a device in accordance with the invention using the ray path of a Mach-Zehnder interferometer. The first beam splitter 11 is designed as a diffracting optical element and so itself forms the wavelength-dependent element. One of the mirrors 20 forms, by suitable means to shift this mirror 20, a phase modulator; the other mirror 30 is pivoted in a suitable manner to select the wavelength to be detected. The partial rays brought to interference by the second beam splitter 13 (combiner) are detected by two detectors 40,40'. The detectors 40, 40' have an areal design and integrate the intensity over the whole cross-section of the ray detected in each case. A lock-in amplifier with differential input is used as the demodulator 50. To control the mirror 20 designed as a phase modulator, the modulator control 60 is used.

Figure 4:
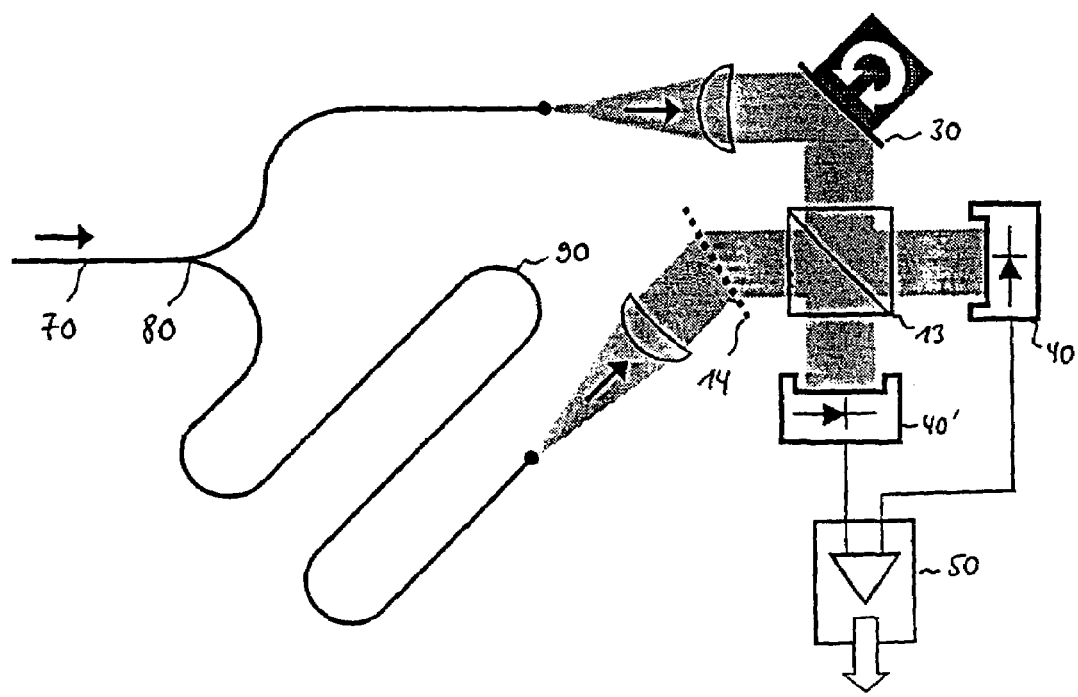
FIG. 4 shows a principle design of a device in accordance with the invention wherein one of the partial rays is delayed in time.

FIG. 4 shows the principle design of an embodiment of the device in accordance with the invention with a time shift between the reference and the signal rays. The change in the relative phase position between the partial rays is achieved by a time displacement of one of the partial rays (delay due to longer period), with a suitable phase modulation or frequency modulation of the signal being a pre-requisite in this case. The incident signal is guided through a glass fibre 70. The first beam splitter 80 is designed with means if fibre glass technology. One part of the signal is expanded after a short period and guided to the conventionally designed second beam splitter 13 via a mirror 30 pivoted in a suitable manner to select the wavelength to be detected. The other ray is delayed by a suitably sized travel distance 90, then expanded and guided to the second beam splitter 13 via the wavelength-dependent element 14 designed here a diffracting optical element. The partial rays brought to interference by the second beam splitter 13 (combiner) are detected by detectors 40, 40'. The detectors 40, 40' have an areal design and integrate the intensity over the whole cross-section of the ray detected in each case. The demodulator 50 is realized electronically and must have a varying design dependent on the modulation type of the signal.

The invention claimed is:

1. A device for detecting or generating optical signals, comprising
    a source of a reference light ray,
    a beam splitter (10) positioned downstream of said source to receive the reference light ray and split the same into two partial rays,
    a prism (12) arranged on a side of the beam splitter (10) and as a wavelength-dependent element,
    a first mirror (20) arranged on a side of said beam splitter (10) opposite said incoming reference ray,
    means for shifting the first mirror (20) to serve as a phase modulator in reflecting a beam back the beam splitter (10),
    a second mirror (30) pivotally arranged on a side of said prism (12) opposite said beam splitter (10) to reflect back and select wavelength of a signal to be detected,
    a detector (40) arranged on a side of said beam splitter (10) opposite said prism (12), said detector integrating intensity over a whole cross-section of the ray to be detected,
    a lock-in amplifier arranged as a demodulator (50) and coupled to said detector (40), and
    a modulator control (60) coupled to both said demodulator (50) and first mirror (20) to act as said shifting means to control the first mirror (20) as the phase modulator.

2. A device for detecting optical signals, comprising
    means (10, 11, 20, 80) structured and arranged for generating at least one reference light ray which has at least one of (i) frequency shift or frequency modulation or both;
(ii) phase shift or phase modulation or both; and
(iii) time displacement,
all (i)-(iii) relating to the optical signal to be detected;
means (20, 30) structured and arranged for aligning at least one of the signals and reference light ray(s) such that they can be brought into interference; and
a detector (40) with a demodulator (50) being structured and arranged to detect amplitude modulation of a resulting signal from said interference;
wherein a wavelength-dependent element (11, 12, 14) is structured and arranged to change angle(s) of at least one of the optical signals and reference ray(s) being brought into interference depending upon wavelength;
said detector (40) is structured and arranged to measure at least one of time and spatial modulation of intensity of at least part of cross-section of the resulting detected signal;
structured and arranged for using a ray path of a Michelson interferometer, and comprising
a beam splitter (10),
a prism (12) structured and arranged as the wavelength dependent element,
a mirror (20) and means for shifting the same to constitute a phase modulator,
another mirror (30) pivotally provided to select the wavelength to be detected,
the detector (40) structured and arranged to integrate intensity over the entire cross-section of the ray to be detected,
a lock-in amplifier as the demodulator (50), and
a modulator control (60) structured and arranged for controlling the first mirror (20) as the phase modulator.

3. A device for generating optical signals by modulation of optical carriers, comprising
means structured and arranged for generating at least one reference light ray which has at least one of
(i) frequency shift or frequency modulation or both;
(ii) phase shift or phase modulation or both; and
(iii) time displacement,
all (i)-(iii) relating to the optical signal to be modulated;
means structured and arranged for aligning an optical signal carrier and at least one of the reference light ray(s) such that they can be brought into interference; and
a coupler structured and arranged to collect a resulting signal from said interference and direct the signal where the resulting signal exhibits modulation;
wherein an angular dispersive element is structured and arranged to change angle(s) of at least one of the optical carrier and reference light ray(s) being brought into interference, depending upon wavelength;
the device is structured and arranged to make the thus coupled-out signal dependent upon at least one of time (amplitude modulation) or spatial modulation of intensity with reference to at least part of cross-section of the resulting interference signal;
structured and arranged for using a ray path of a Michelson interferometer, and comprising
a beam splitter (10),
a prism (12) structured and arranged as the angular dispersive dependent element,
a mirror (20) and means for shifting the same to constitute a phase modulator,
another mirror (30) pivotally provided to select the wavelength to be modulated, and
a modulator control (60) structured and arranged for controlling the first mirror (20) as the phase modulator.

4. A device for detecting optical signals, comprising
means (10, 11, 20, 80) structured and arranged for generating at least one reference light ray which has at least one of
(i) frequency shift or frequency modulation or both;
(ii) phase shift or phase modulation or both; and
(iii) time displacement,
all (i)-(iii) relating to the optical signal to be detected;
means (20, 30) structured and arranged for aligning at least one of the signals and reference light ray(s) such that they can be brought into interference; and
a detector (40) with a demodulator (50) being structured and arranged to detect amplitude modulation of a resulting signal from said interference,
wherein an angular dispersive element (11, 12, 14) is structured and arranged to change angle(s) of at least one of the optical signals and reference ray(s) being brought into interference depending upon wavelength;
said detector (40) is structured and arranged to measure at least one of time and spatial modulation of intensity of at least part of cross-section of the resulting detected signal;
said device is structured and arranged to receive a wavelength-division multiplexed (WDM) communication signal carrying phase-modulated or frequency-modulated data, said WDM communication signal further comprising a plurality of communication channels, each of said channels designated by a respective wavelength; and
said detector (40) with a demodulator (50) being structured and arranged to demodulate data from the detected channel.

* * * * *